United States Patent
Bordaz et al.

(10) Patent No.: US 6,195,731 B1
(45) Date of Patent: Feb. 27, 2001

(54) INSTRUMENTATION DEVICE FOR A MACHINE WITH NON-UNIFORM MEMORY ACCESS

(75) Inventors: Thierry Bordaz, Domène; Jean-Dominique Sorace, Lancey, both of (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/083,154

(22) Filed: May 22, 1998

(30) Foreign Application Priority Data

May 26, 1997 (FR) .................................................. 97 06387

(51) Int. Cl.[7] .................................................. G06F 12/00
(52) U.S. Cl. .......................... 711/147; 711/122; 711/141; 711/206; 365/236
(58) Field of Search .............................. 365/236; 379/10; 380/24; 709/101, 102; 711/122, 141, 206, 147

(56) References Cited

U.S. PATENT DOCUMENTS

| | | | |
|---|---|---|---|
| 4,068,304 | * | 1/1978 | Beausoleil et al. .................. 395/500 |
| 5,887,146 | * | 3/1999 | Baxter et al. ........................ 710/104 |
| 6,014,690 | * | 1/2000 | VanDoren et al. .................... 709/215 |

OTHER PUBLICATIONS

Lenoski D et al.: The Dash Prototype: Logic Overhead and Performance IEEE Transactions on Parallel and Distributed Systems, vol. 4, No. 1, Jan. 1, 1993 pp. 41–61, XP000381324.

Verghese B. et al.: "Operating System Support for Improving Data Locality on CC–Numa Compute Servers", ACM Sigplan Notices, vol. 31, No. 9, Sep. 1996, pp. 279–289, XP000639239.

Roth C et al: "Performance Monitoring on the PowerPCTM 604 Microprocessor" International Conference on Computer Design: VLSI in Computers and Processors, Austin, Oct. 2–4, 1995, Oct. 2, 1995, Institute of Electrical & Electronics Engineers, pp. 212–214, XP000631915.

* cited by examiner

Primary Examiner—Do Hyun Yoo
Assistant Examiner—Mehdi Namazi
(74) Attorney, Agent, or Firm—Miles & Stockbridge P.C.; Edward J. Kondracki

(57) ABSTRACT

A machine with non-uniform memory access and cache coherency is constituted by a plurality of modules (10, 20, 40, 60), each module comprising a unit (6, 26, 46, 66), the unit (6) comprising at least one table (8) for managing local accesses to a memory part (5') local to the module (10) and one table (9) for managing accesses to a memory part (25', 45', 65') remote from the module (10), by means of a system bus (7). The machine comprises:

a counter (81) of hits in the local memory part (5') without a transaction with a remote module;

a counter (82) of misses in the local memory part (5') accompanied by at least one transaction with a remote module;

a counter (91) of hits in the remote memory part (25', 25', 65') without a transaction with a remote module;

a counter (92) of misses in the remote memory part (25', 45', 65') accompanied by at least one transaction with a remote module.

11 Claims, 5 Drawing Sheets

INSTRUMENTATION DEVICE FOR A MACHINE WITH NON-UNIFORM MEMORY ACCESS

CROSS REFERENCE TO RELATED APPLICATION

The subject matter of this application is related to U.S. application Ser. No. 09/082,938, in the names of Thierry BORDAZ and Jean-Dominique SORACE, filed concurrently herewith and assigned to the Assignee of the present invention and corresponding to French application 97 06388 filed May 26, 1997.

1. Field of the Invention

The invention relates to an instrumentation device for a machine with non-uniform memory access, in the data processing field.

2. Background of the Invention

In the data processing field, it is possible to increase the power of a machine by increasing the number of processors of which it is composed. One type of machine known as a symmetrical memory processor (SMP) allows various processors in the same machine to access its memory symmetrically by means of a system bus. These are machines with uniform memory access, in that the memory access time is substantially the same for all the data accessed. However, the performance curve of such machines does not increase in a linear way as a function of the number of processors. A high number of processors requires the machine to manage more problems of accessibility to its resources than it has resources available for running applications. The result of this is that the performance curve drops considerably when the number of processors exceeds an optimum value, often estimated to be on the order of four. The prior art offers various solutions to this problem.

One known solution consists of grouping a plurality of machines into clusters, in order to have them communicate with one another through a network. Each machine has an optimal number of processors, for example four, and its own operating system. It establishes a communication with another machine every time it performs an operation on data maintained by this other machine. The time required for these communications and the need to work on consistent data causes latency problems for high-volume applications such as, for example, distributed applications which require numerous communications. Latency is the duration that separates the instant at which a request for access to the memory is sent, and the instant at which a response to this request is received.

Another known solution is that of machines of the non-uniform memory access (NUMA) type. These are machines with non-uniform memory access, in that the memory access time varies according to the location of the data accessed. A NUMA type machine is constituted by a plurality of modules, each module comprising an optimal number of processors and a physical part of the total memory of the machine. A machine of this type has non-uniform memory access because it is generally easier for a module to access a physical part of the memory that it does not share with another module than to access a part that it shares. Although each module has a private system bus linking its processors and its physical memory, an operating system common to all the modules makes it possible to consider all of the private system busses as a single, unique system bus of the machine. A logical addressing assigns a place of residence to a predetermined physical memory location of a module. For a specific processor, accesses to a local memory part physically located in the same module as the processor are distinguished from accesses to a remote memory part, physically located in one or more modules other than that in which the processor is located.

One particular type of NUMA machine is the cache coherency non-uniform memory access (CCNUMA) type, that is, the type of machine having cache coherency. A shared caching mechanism ensures that at a given instant, a valid, that is updated, copy of this block is not necessarily located in its physical memory location of residence. Thus, one or more valid copies of the block can migrate from one module to another in response to application requests and system requests. The performance of the machine depends directly on the speed with which a module accesses a valid copy of a block it is processing. It is advisable to set up the operating system of the machine and the applications run by this machine in such a way that each module processes, insofar as possible, copies of clocks located in its physical memory which, whenever possible, are valid. The accesses to these valid copies are the fastest, since they require the fewest transactions with other modules.

The design of an operating system, and subsequently of applications, requires properly taking into account the repercussions it has on the performance of the machine. It is possible to consider testing the operating system or the applications using programs that simulate the behavior of the machine with this operating system or with these applications. Thus it may be possible to learn how to adapt the operating system and/or the applications, for example by playing with the allocation of addresses, the creation of software tables or the sequencing of tasks. However, it is difficult to anticipate all the cases that will occur in the effective operation of the machine.

SUMMARY OF THE INVENTION

A first object of the invention is to provide a machine with non-uniform memory access constituted by a plurality of modules, each module comprising a unit with a table for managing local accesses to a memory part local to the module and a table for managing accesses to a memory part remote from the module, by means of a system bus, characterized in that the machine comprises:

a counter of hits in the local memory part not requiring a transaction with a remote module;

a counter of misses in the local memory part requiring at least one transaction with a remote module;

a counter of hits in the remote memory part not requiring a transaction with a remote module;

a counter of misses in the remote memory part requiring at least one transaction with a remote module.

This makes it possible to measure in real time the ratio of fast memory accesses, which do not require a transaction to ensure cache coherency, and slow memory accesses, which require at least one transaction to ensure cache coherency. However, a problem can always arise if the use of the resources required for the incrementation of these counters diminishes the performance of the machine.

A second object of the invention relates to a machine with non-uniform memory access, characterized in that the four counters are physically located in this unit. Thus, the incrementation of the counters does not require the use of any additional resource via the system bus.

In accordance with the present invention, there is provided a process for calculating the average memory access time is therefore comprised of multiplying the contents:
  of the counter of hits in the local memory part by the average hit time in the local memory part,
  of the counter of misses in the local memory part by the average miss time in the local memory part,
  of the counter of hits in the remote memory part by the average hit time in the remote memory part,
  of the counter of misses in the remote memory part by the average miss time in the remote memory part,
adding the four results thus obtained,
and dividing this sum by the sum of the contents of the four access counters.

It is possible to consider determining the average time for each type of access with the aid of a bus analyzer implemented during the testing of the machine. The average times determined in this way are then supplied as characteristic parameters with the machine. The times required for hits without a transaction with a remote module, whether in the local memory part or in the remote memory part, are practically constant since they depend only on the load of the bus local to the module. The average of these access times, calculated a priori by means of a standard bus analyzer, is therefore representative of the subsequent behavior of the machine in operation, with an acceptable level of reliability. However, the misses accompanied by transactions with remote modules result in latencies, which depend on the latencies of the transactions themselves. If, during the subsequent operation of the machine, the cache coherency protocol is heavily used, to the point of overloading the links between modules, the access times can vary substantially. The average miss times determined a priori may no longer represent the actual average access times with satisfactory reliability. One solution is to apply corrective weighting coefficients to the average miss times, as a function of the effective operation of the machine. The average miss times are, for example, a function of the number of misses known by the miss counters. It is therefore preferable a priori to model the calculation of these average miss times to include the number of transactions.

A further advantage is obtained by the present invention if the machine with non-uniform memory access comprises:
  a second remote memory latency counter for adding up the latencies of the accesses to the local memory part that require a transaction with a remote module;
  a counter for adding up the latencies of the accesses to the remote memory part that require a transaction with a remote module.

These two counters make it possible to obtain average times for the accesses accompanied by transactions, effective for any operation of the machine, without being concerned a priori with untimely demands on the cache coherency protocol. It is therefore possible in accordance with the present invention to implement a process for calculating the average memory access time, which is comprised of
  multiplying the contents:
    of the counter of local memory hits by the average hit time in the local memory part,
    of the counter of remote memory hits by the average hit time in the remote memory part,
  adding the two results thus obtained to the contents of the counter for adding up the latencies of the accesses to the local memory part that require a transaction with a remote module and of the counter for adding up the latencies of the accesses to the remote memory part that require a transaction with a remote module,
  and of dividing this sum by the sum of the contents of the four access counters.

BRIEF DESCRIPTION OF THE DRAWINGS

The invention will be more clearly understood with the aid of the following description of an exemplary embodiment, in reference to the figures.

DESCRIPTION OF THE PREFERRED EMBODIMENTS

Figure 1:
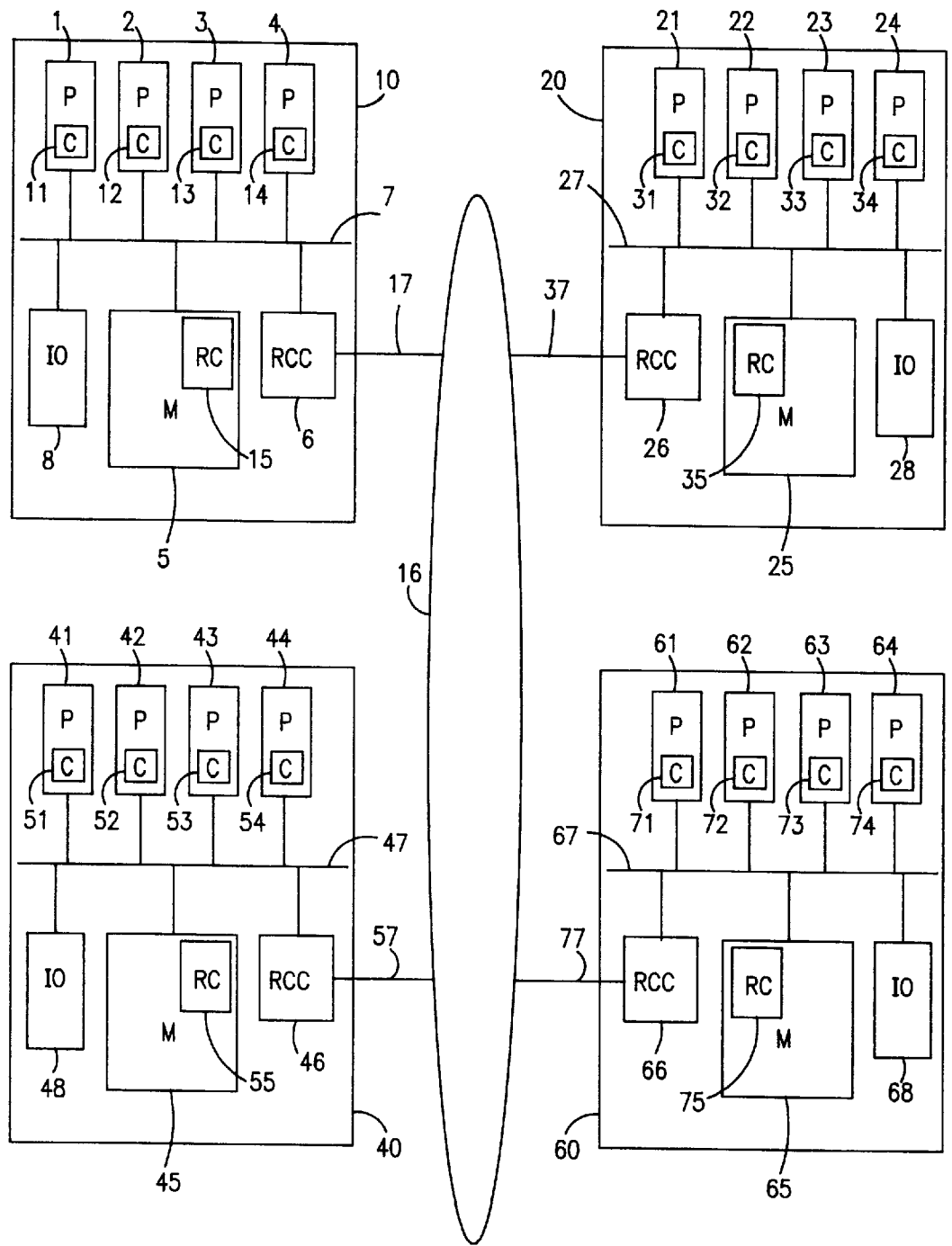
FIG. 1 presents an architecture of a machine with four modules.

FIG. 1 presents an exemplary architecture of a machine with non-uniform memory access constituted by four modules 10, 20, 40 and 60 interconnected by means of a ring 16. The following description in reference to FIG. 1 is valid for any number of modules greater than or equal to two. The connection between the modules can be achieved by means of one or more switched rings or by any other types of connections such as grid or hypercube interconnections or crossbar switches, to cite just a few of the better known types. The interconnection of the modules makes it possible to carry out transactions between modules that use the memory coherency protocol.

The module 10 comprises four processors 1 through 4, a memory 5 and a unit 6 for connecting to the other modules through the ring 16. The various elements 1 through 6 are connected to one another through a system bus 7 in the module 10. The module 20 comprises four processors 21 through 24, a memory 25, and a unit 26 for connecting to the other modules through the ring 16. The various elements 21 through 26 are connected to one another through a system bus 27 in the module 20. The module 40 comprises four processors 41 through 44, a memory 45 and a unit 46 for connecting to the other modules through the ring 16. The various 7 elements 41 through 46 are connected to one another through a system bus 47 in the module 40. The module 60 comprises four processors 61 through 64, a memory 65 and a unit 66 for connecting to the other modules through the ring 16. The various elements 61 through 66 are connected to one another through a system bus 67 in the module 60. The unit 6, respectively 26, 46, 66, is connected to the ring 16 by means of a link 17, respectively 37, 57, 77.

Each processor 1 through 4, 21 through 24, 41 through 44, 61 through 64 respectively has a private, internal and/or external cache memory 11 through 14, 31 through 34, 51 through 54, 71 through 74. Moreover, the module 10 comprises a remote access cache memory 15 labelled RC, the module 20 comprises a remote access cache memory 35 labelled RC, the module 40 comprises a remote access cache memory 55 labelled RC, and the module 60 comprises a remote access cache memory 75, labelled RC. In order to be able to parameterize the size of the cache memory 15, 35, 55, and/or 75, it is advantageous to physically locate the latter in a dedicated area of the memory 5, 25, 45, 65, respectively, as shown in FIG. 1. In this case, the description below will consider the memory 5', respectively 25', 45', 65', to be constituted by data blocks of the memory 5, respectively 25, 45, 65 which do not comprise data blocks of the cache memory 15, respectively 35, 55, 75. In the case where the cache memories 15, 35, 55, 75 are embodied by means of physical components different from those of the memories 5, 25, 45, 65, the references 5', 25', 45', 65', which are identical to the references 5, 25, 45, 65, must be included.

Each processor 1 through 4, 21 through 24, 41 through 44, and 61 through 64 accesses data blocks contained in the memories 5', 25', 45', 65' by means of logical addresses of a single address space, without distinguishing whether the memories 5', 25', 45', 65' are local, belonging to the same module as the processor, or remote, belonging to a different module than the processor. In the module 10, it is the unit 6 that distinguishes whether the logical address corresponds to a local physical address of a block resident in the memory 5', or whether the logical address corresponds to a remote physical address of a block resident in one of the modules 20, 40, 60, for example by means of the high-order bits of the logical address, which indicate the module in which the addressed memory is physically located, the low-order bits in this case indicating the physical address in the module of residence. In the module 20, it is the unit 26 that distinguishes whether the logical address corresponds to a local physical address of a block resident in the memory 25', or whether the logical address corresponds to a remote physical address of a block resident in one of the modules 40, 60, 10, for example by means of the high-order bits of the logical address, which indicate the module in which the addressed memory is physically located, the low order bits in this case indicating the physical address in the module of residence, and so on for the other modules. The aforementioned high-order bits constitute a field A4 of the logical address. The data blocks accessed in this way constitute a memory set SM shared by all the processors.

The following example in reference to the processor 1 is valid for all of the other processors 2 through 4 in reference to the module 10, as well as 21 through 24 in reference to the module 20, 41 through 44 in reference to the module 40 and 61 through 64 in reference to the module 60.

The processor 1 processes a word contained in a data block B1 of the set SM by means of its private cache memory 11 using a known caching mechanism, such as a mechanism with direct correspondence, associative correspondence, or associative correspondence by block set, and it is not necessary to review these various mechanisms here.

It need only be recalled that a cache memory essentially comprises a fast access memory and a correspondence table, not represented in the figures. In the case of a direct correspondence or direct mapping mechanism, there are essentially three fields distinguished in the logical address of a word, in decreasing order of bit significance: a first field A1 called a label, a second field A2 called an index and a third field A3 called an address of the word in the data block containing this word. The first and second fields usually constitute the logical address of the block B1. The index A2 points to a line of a correspondence table which essentially contains two values. The first value is the label A1' of a block B2, a physical image of which is addressed directly in the fast access memory by this same index. The second value is a status code which indicates whether the block B2 is maintained exclusively by the processor or shared by another processor, and in the latter case whether its content is valid or whether it has been modified by this other processor.

If the label A1 of the block B1 is equal to the label A1' of the block B2 and if the status code indicates exclusivity or a valid content, the block B2 is none other than the block B1 physically contained in the fast access memory, and the processor can process the words contained in this block directly by physically addressing them in the fast access memory using the second and third fields of the logical address. If the status code indicates sharing, the caching mechanism sends through the bus 7 a signal S1 to indicate a modification at the address of the block B1, in order to modify the status code of this block in the cache memories that share it.

If the label A1 of the block B1 is different from the label A1' of the block B2 or if the status code indicates sharing and a modified content, the processor can not process the words contained in this block directly by physically addressing them in the fast access memory using the second and third fields of the logical address. If the status code indicates exclusivity, the caching mechanism sends a request Q2 to write the block B2 into the shared memory so as to free up a space in the cache memory at the physical address indicated by the index A2, then sends a request Q1 to read the block B1 in the shared memory in order to load the block B1 into the cache memory at the physical address indicated by the index A2. If not, the caching mechanism sends a request Q1 to read the block B1 in the shared memory in order to load the block B1 into the cache memory at the physical address indicated by the index A2.

Figure 2:
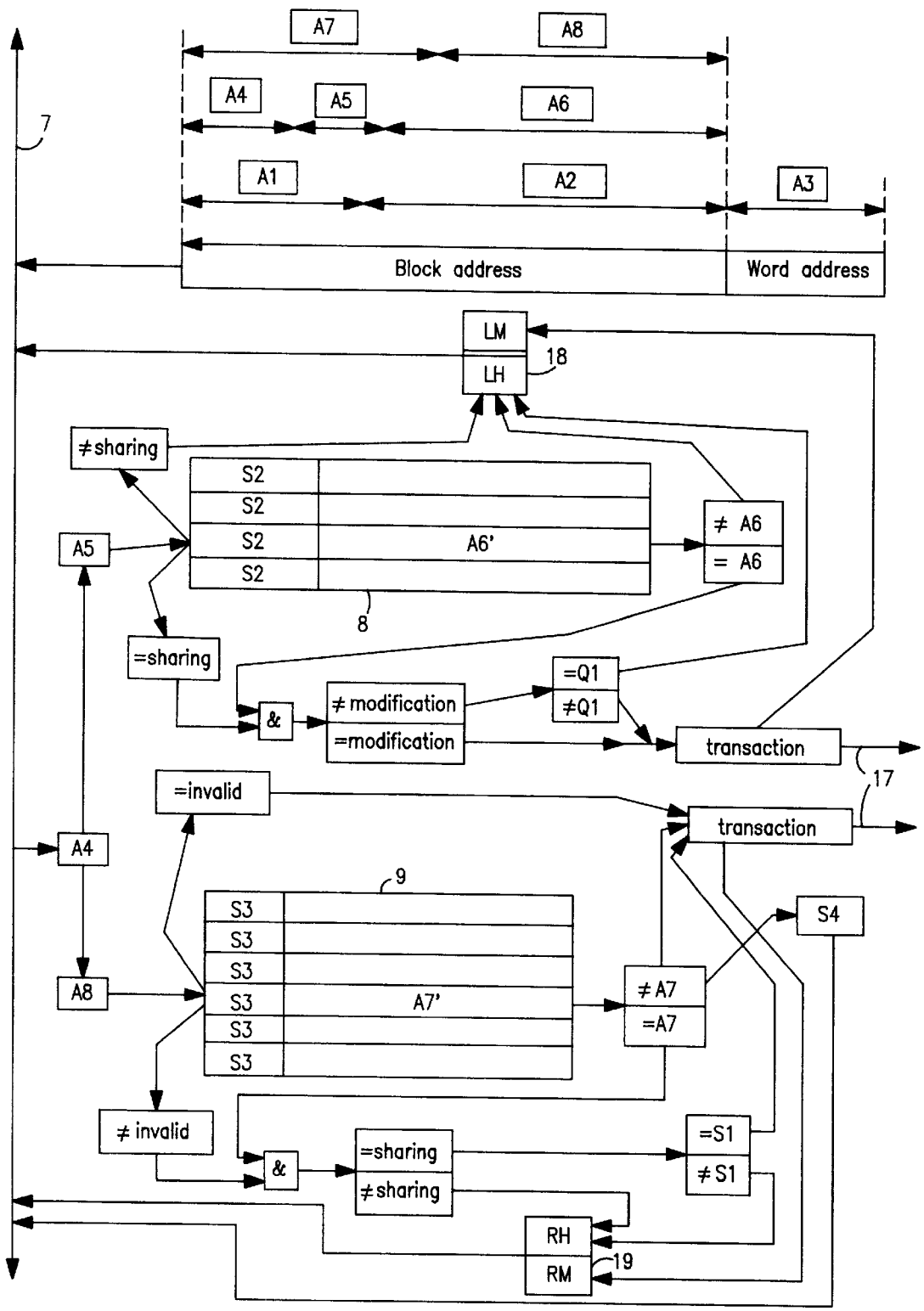
FIG. 2 presents certain details of the aforementioned unit, located in a module considered to be local.

FIG. 2 presents a first level of detail of the unit 6, with the hardware and logical components involved when a block address constituted by the fields A1 and A2 travels through the bus 7 while being linked to a signal S1 or a request Q1 or Q2. The unit 6, labelled RCC, comprises a table 8, labelled LMD, a table 9, labelled RCT, a register 18 and a register 19. The address of the block is also divided into three fields A4 through A6 or into two fields A7 and A8. The field A4 is constituted by bits of a higher order than those of the field A5 and the field A6 is constituted by bits of a lower order than those of the field A5. The field A8 is constituted by low order bits and the field A7 is constituted by high order bits in a quantity greater than that of the bits of the field A4 so as to overlap the field A4 by a number of high order bits. The purpose of the fields A4 through A8 will be revealed later in the description. The logic for writing in the registers 18 and 19 as a function of the values of the fields A4 through A8 is represented by means of cells in which logical functions are indicated. Each pair of cells containing the same word, preceded by the sign = in one and the sign ≠ in the other, represents a comparator whose result activates a logical level downstream. One of two possible states of a signal, symbolically represented by a pair of cells, is written in each of the registers 18 and 19. The logic described can be embodied by means of a microprocessor specifically dedicated to the unit 6. Implementing this logic by means of hardware circuits increases its execution speed. The explanations in reference to FIG. 2 for the unit 6 considered to be local to the module 10 and remote from the modules 20, 40, 60 remain valid for the units 26, 46, 66 by replacing the references by circular permutation, and particularly by replacing, according to the same circular permutation, 8 with 28, 48 or 68, and 9 with 29, 49 or 69 depending on the module in question.

When the unit 6 sees the signal S1, the request Q1 or the request Q2 passing through the bus 7, it processes the block in question through a caching mechanism, using its table 8 if the high order bits contained in the field A4 of the logical address indicate that the block in question physically resides in the memory 5', local to the module 10, and using its table 9 if the high order bits of the label indicate that the block in question physically resides in one of the remote modules 20, 40 or 60.

The table 8 is indexed by m bits constituting a field A5 of the logical address which follows the high order bits of the label. The value of the number m directly determines the size of the table 8, wherein the number of lines is equal to $2^m$. Each line of the table 8 contains the low order bits constituting a field A6 of the logical address of a block shared with one or more remote modules and a status code S2. The status code S2 is, for example, a byte that contains at least as many bits as the machine contains modules. A bit is assigned to each module remote from the module 10 in which the block referenced by the fields A5 and A6 resides, in order to indicate the presence of a sharing of this block with the remote module. A bit indicates whether the block has been modified by a remote module. At a given instant, only one module holds the modified copy that constitutes the most recently updated copy of the block. This means that if the status code S2 indicates a modification, there is no more than one presence bit which indicates the sharing of this block with a remote module, and that is the bit assigned to the module that contains the most recently updated version. The copies of the block in the other modules are invalidated. In this case, the low order bits of the logical address of a block are the bits that follow the aforementioned m bits, in such a way that the concatenation of the fields A4, A5 and A6 overlaps the concatenation of the fields A1 and A2. The fields A5 and A6 make it possible to physically address the block in the local memory constituted by the memory 5'.

If the line indexed by the m bits of the field A5 contains an address value different from that of the block processed, this means that no module other than the module 10 accesses it. The processing of the block therefore remains local to the module 10 and it is not necessary to index it in the table 8, since its updating in the memory 5' and possibly in the private cache memories 11 through 14 is enough. The unit 6 generates a local hit signal LH to indicate a local hit without any transaction with a remote module. The signal LH is written into the register 18. The same is true if no bit of the status code S2 indicates sharing with a remote module.

If the line in the table 8 indexed by the m bits of the field A5 contains an address value A6 equal to that of the block processed, and at least one bit of the status code indicates sharing, this means that a module other than the module 10, for example the module 20, has accessed it previously. In this case, the processing of the block depends on its previous access by the remote module 20 and on the processing related to this block. If the status code S2 indicates that the block is currently in shared use, the unit 6 determines whether it is necessary to carry out a transaction with the remote module 20.

If the status code S2 indicates that the block has been modified by a remote module, a read request Q1 requires a transaction with the remote module that holds a valid copy of the block in order to retrieve this valid copy into the physical memory resident in the module 10, so the unit 6 generates a local miss signal LM to indicate a local miss, which is accompanied by at least one transaction with a remote module. The signal LM is written into the register 18, then the unit 6 updates the code S2 to the unmodified status at the end of the transaction.

If the status code S2 does not indicate that the block has been modified by a remote module, a read request Q1 does not require a transaction with any remote module, since the module 10 is holding a valid copy of the block, so the unit 6 generates a local hit signal LH. On the other hand, a signal S1 indicating a modification or a request Q2 to write the block requires a transaction with each remote module for which a bit of the code S2 indicates a presence, in order to inform it that the copy of the block it holds is not valid, so the unit 6 generates the local miss signal LM.

The generation of the signals LH and LM has been explained with a write-back caching mechanism. With a write-through caching mechanism, it is understood that the request Q1 does not require a transaction, since the module 10 holds an updated copy of the block, so the unit 6 generates a signal LH, and that the request Q2 or the signal S1 requires a transaction with at least one remote module 20 in order to update the copy of the block in this module, in which case the unit 6 generates a signal LM.

The table 9 is indexed by n low order bits of the logical address, which constitute a field A8. The value of the number n directly determines the size of the table 9, wherein the number of lines is equal to $2^n$. Each line of the table 9 contains a status code S3 and the field A7 of the logical address, which references a copy of a block indexed directly in the cache memory 15 by the field A8. The size of the cache memory 15 is therefore $2^n$ blocks. The status code S3 is constituted, for example, by two bits for coding three states Inv, Sha, Mod, which indicate the state of a block referenced in the table 9 by the field A8. The state Inv indicates that the referenced block is invalid, which means that the referenced block has been modified by a remote module 20, 40 or 60. The state Sha indicates that the referenced block is shared by at least one remote module 20, 40, 60. The state Mod indicates that the referenced block has been modified by the local module 10 and that its copy in the cache memory 15 is up-to-date.

If the line indexed by the n bits of the field A8 contains a value of the field A7' equal to that of the block processed, this means that the block resident in a module other than the module 10, for example in the module 20, has been copied into the cache memory 15 common to the processors 1 through 4. The cache memory is sized to contain $2^n$ blocks referenced in the table 9. Just as the size of the table 9 can be parameterized by choosing the value of n, so can the size of the cache memory 15. One advantageous way to enable it to be parameterized is to obtain a dedicated address storage area from the memory 5 and allocate it to the cache memory 15. This method is then repeated in each remote module 20, 40, 60 in order to allocate a dedicated address storage area in the memory 25, 45, 65 to a cache memory 35, 55, 75. Since the size of the cache memories 15, 35, 55, 75 is small relative to that of the memories 5, 25, 45, 65, this method only slightly reduces the size of the memory common to all the modules.

The unit 6 then considers the status code S3 of the block referenced in the table 9, that is, the block processed by the signal S1 or a request Q1, Q2. If the status code S3 indicates that the block is invalid, the unit 6 generates the same transactions and the same signals as though the line indexed by the n bits of the field A8 contained a value of the field A7' different from that of the block processed, as explained later in the description.

If the status code S3 indicates that the block is not shared by another module, no transaction with a remote module is necessary, and the unit 6 generates a remote hit signal RH to indicate a remote hit achieved without a transaction with a remote module.

If the status code in the table 9 indicates that the block is currently in shared use, the unit 6 determines whether it is necessary to execute a transaction with the remote module 20. For the signal S1, a transaction is necessary to write into the status code S2 of the module 20, in which the block is resident, that the block has been modified, and into the status code S3 of the module 40 or 60, which possesses a copy of the block in its cache memory 55, 75, that the block is invalid; the unit 6 then generates a remote miss signal RM to indicate a remote miss for which at least one transaction with a remote module has been initiated. The unit 6 declares in its status code S3 that the block has been modified. For the read request Q1, if the status code S3 in the table 9 indicates that the content of the block in the module 10 is valid, no transaction is necessary and the unit 6 generates a remote hit signal RH; if the status code in the table 9 indicates that the content of the block in the module 10 is invalid, a transaction is necessary to update the content of the block in the module 10, so the unit 6 generates a remote miss signal RM and declares in its status code S3 at the end of the transaction that the block is valid. For the request Q2 to write into the memory remote from the module 10, no transaction is necessary, and the unit 6 generates a remote hit signal RH. The generation of the signals RH and RM has been explained here with a write-back caching mechanism. With a write-through caching mechanism, it suffices to modify the logic described so that the signal S1 and the request Q2 require a transaction with the remote module 20, 40, 60 in order to update the block in each of them, the unit 6 in this case generating a signal RM, in such a way that the request Q1 does not require a transaction, since the content of the block has been updated systematically.

If the line indexed by the n bits contains an address value different from that of the block processed, this means that the block addressed logically in the cache memory 15 by the indexing of the table 9 is different from the processed block. In this case, it is necessary to replace the block referenced in the table 9 with the processed block. Therefore, the unit 6 generates a signal RM. The unit 6 in this case also generates a signal S4 to indicate a replacement, in the cache memory 15, of the indexed block with the processed block. The signal S4 is sent through the bus 7 to invalidate, in the private cache memories 11 through 14, the block indexed in the cache memory 15, since the table 9 can no longer guarantee its coherency. The unit 6 then performs an update on the table 9 by means of a transaction with the remote modules 20, 40, 60, in order to retrieve the processed block at a physical location addressed logically in the cache memory 15 by the indexing of the table 9. The transaction essentially consists of sending a read request directed for the remote module 20, 40 or 60 in which the block resides. In order to simplify the description, it will be assumed, for example, that the block's module of residence is the module 20.

Figure 3:
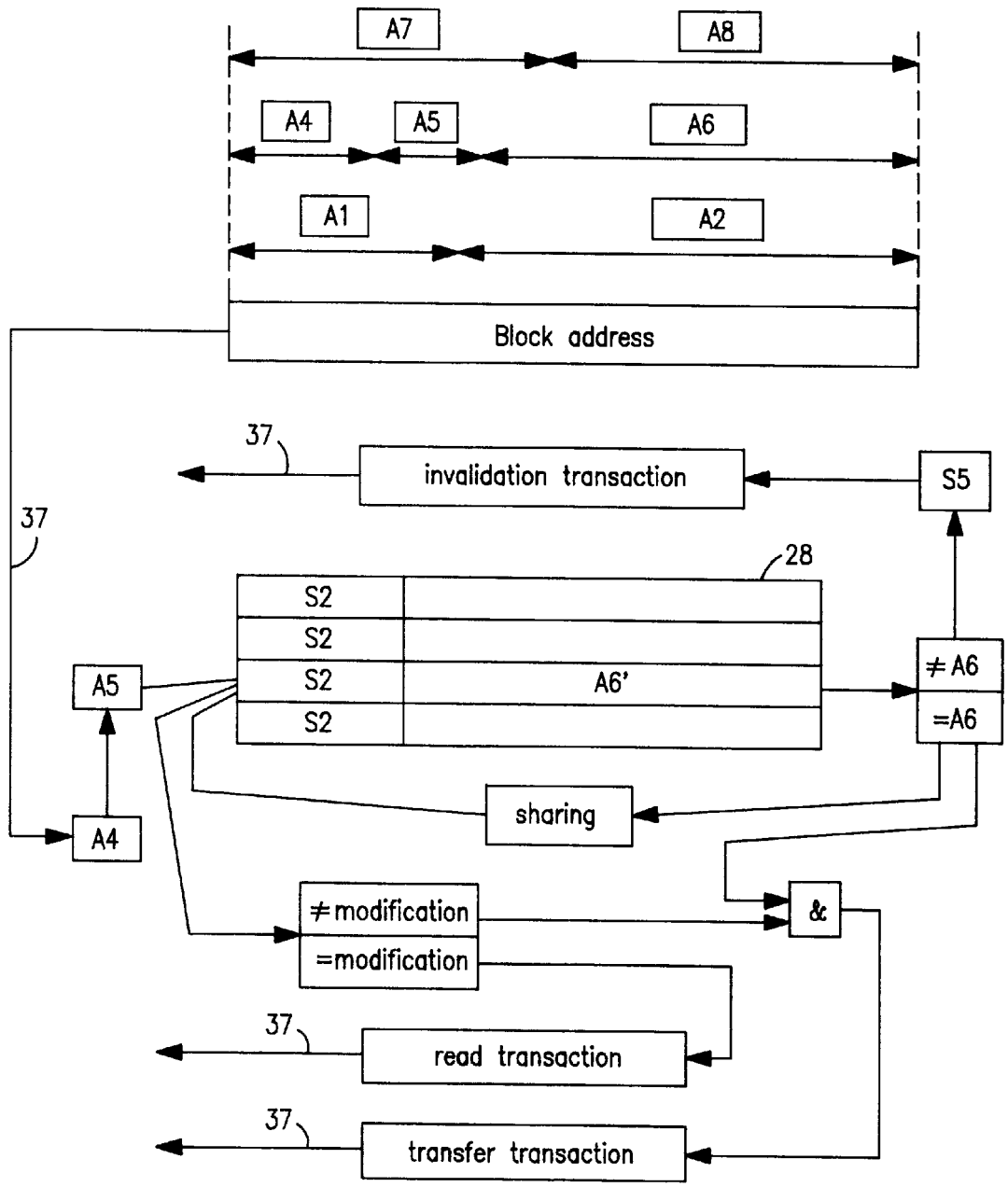
FIG. 3 presents certain details of the aforementioned unit, located in a module considered to be remote.

FIG. 3 presents a second level of detail of the unit 6, 26, 46, 66 with the hardware and logical elements involved when a block address constituted by the fields A1 and A2 arrives in this block's module of residence, having come from other modules through the link 17, 37, 57, 77. The remarks made in the introductory preamble to FIG. 2 remain valid for FIG. 3. In particular, the reference numbers used in FIG. 3 are those of the unit 26 in order to simplify the rest of the description.

If the processed block is indexed in the table 28, its status code S2 is updated in order to indicate that the block is shared by the module 10. If, on the line of the table 28 that indexes the processed block, the status code S2 indicates that the block has not been modified by any other module 40, 60, the unit 26 transmits a copy of the block to the unit 6. This copy is obtained by reading in the memory 25 or in one of the cache memories 31 through 34. If the status code indicates that the block has been modified, the unit 26 sends a read request to the module 40 or 60 that possesses the most recently updated version of the block. The unit 46 or 66 that possesses the most recently updated copy transmits the copy of the block to the unit 6 of the module 10 and to the unit 26 of the module 20. The unit 26 updates its local memory 25', and its code S2 to the shared status. The unit 6 indexes the block in the table 9 with a shared, unmodified status code and writes the block into the cache memory 15. Then, the unit 6 sends an acknowledgement to the unit 26, which adds to its status code S2 the sharing with the module 10.

If the processed block is not indexed in the table 28, the unit 26 generates a signal S5 to indicate that the indexed block will be replaced by the processed block. If the status code S2 of the indexed block indicates that the latter has been modified by a module 10, 40 or 60, the unit 26 sends a read request to the module 10, 40 or 60 that holds the most recently updated version of the block. The unit 6, 46, 66 in which the code S3 of the indexed block indicates that its copy of the block is not invalid, transmits a copy of the block to the unit 26 of the module 20 in order to update its local memory 25'. The signal S5 is sent to the unit or units 6, 46, 66 which reference the block in a line of their table 8, 48, 68 so that each of them updates its code S3 to the invalid status. Then, the unit 26 indexes the processed block in its table 28 with a status code S2 indicating that the block is shared with the module 10, unmodified. Finally, the unit 26 transmits the content of the processed block to the unit 6, which indexes the block in the table 9 with a non-invalidated, shared and unmodified status code and writes the block into the cache memory 15. If the status code S2 of the block indexed in the table 28 does not indicate that the latter has been modified, the signal S5 is sent to the unit or units 6, 46, 66, which reference the block on one line of their table 8, 48, 68 so that each of them updates its code S3 to the invalid status. Next, the unit 26 indexes the processed block in its table 28 with a status code S2 indicating that the block is shared with the module 10, unmodified. Finally, the unit 26 transmits the content of the processed block to the unit 6, which indexes the block in the table 9 with a non-invalidated, shared and unmodified status code and writes the block into the cache memory 15.

The preceding explanations are based on a direct correspondence caching mechanism. The implementation of the teaching provided should not pose any insurmountable problem for one skilled in the art when using other known caching mechanisms such as those with associative correspondence or associative correspondence by block set, in all or some of the private cache memories 11 through 14, 31 through 34, 41 through 44, 61 through 64 and the tables 8, 9, 28, 29, 48, 49, 68, 69.

In particular, it is advantageous to use an associative correspondence by block set, for example in sets of four blocks, in the tables 8, 28, 48, 68. In effect, a line replacement in the table 9, respectively 29, frequently results in a line replacement in the table 28, respectively 8.

Figure 4:
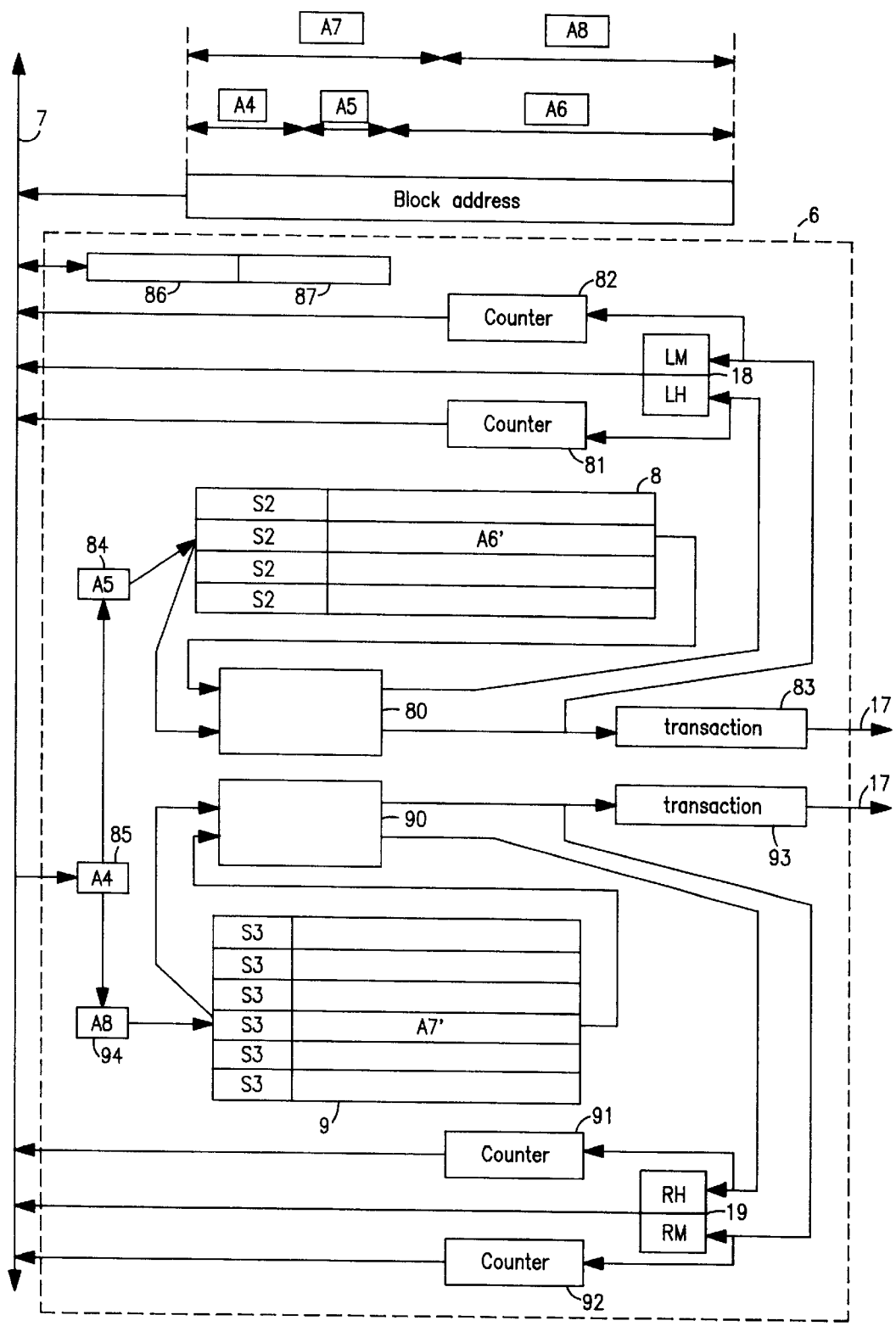
FIG. 4 presents other details of this unit for implementing the invention.

FIG. 4 presents additional details of the unit 6. The units 26, 46, 66 are identical. The structure of a block address passing through the bus 7 is only represented here by the fields A4 through A8 because, as seen above, the fields A1 and A2 are more particularly useful for the level of the private cache memories 11 through 14. A filter 85 routes the address of the block to the table 8 if the field A4 relates to a block address resident in the module 10 or to the table 9 if the field A4 relates to a block address residing in the module 20, 40, 60 remote from the module 10. An index register 84 points to an entry in the table 8 addressed by the field A5 of the block address. An index register 94 points to an entry of the table 9 addressed by the field A8 of the block address.

If the filter 85 routes the address of the block to the table 8, a combinational logic element 80 generates a signal LH or a signal LM and a remote transaction as a function of the values of the status code and the field A6' stored in the table 8, on the line pointed to by the index register 84. The element 80 groups, for example, the various comparators and logic gates of FIG. 2 linked to the table 8. Each remote transaction generated concomitantly with the signal LM is written into a buffer register 83 in order to be sent in the form of a request through the link 17, and to wait for a response through the same link 17. A writing of the signal LH, respectively LM, into the register 18, increments a counter 81, respectively 82. The contents of the counters 81 and 82 are accessible through the bus 7, for example by means of a read operation of the input-output type.

If the filter 85 routes the address of the block to the table 9, a combinational logic element 90 generates a signal RH or a signal RM and a remote transaction as a function of the values of the status code and the field A7' stored in the table 9, on the line pointed to by the index register 94. The element 90 groups, for example, the various comparators and logic gates of FIG. 2 linked to the table 9. Each remote transaction generated concomitantly with the signal RM is written into a buffer register 93 in order to be sent in the form of a request through the link 17, and to wait for a response through the same link 17. A writing of the signal RH, respectively RM, into the register 19 increments a counter 91, respectively 92. The contents of the counters 91 and 92 are accessible through the bus 7, for example by means of a read operation of the input-output type.

Each of the counters 81, 82, 91, 92 is designed to send an interrupt through the bus 7 in case of an overflow. FIG. 4 also distinguishes a control register 86 and a status register 87. The register 86 is read- and write-accessible through the bus 7. The register 87 is read-accessible through the bus 7 and systematically reset to zero by a reading of its contents.

The register 87 contains, for each counter 81, 82, 91, 92, a bit whereof a predetermined logical state indicates an overflow of the counter to which this bit is assigned.

The register 86 contains bits for controlling the counters 81, 82, 91, 92 by means of a combinational logic element, which is not represented so as not to complicate the figure unnecessarily. A first bit is provided for deactivating the counters unconditionally, so that one logical state of the bit makes it impossible to modify the contents of the counters by writing in the registers 18 and 19 and so that the complementary logical state of the bit makes it possible to modify the contents of the counters by writing in the registers 18 and 19. A second bit is provided for deactivating the counters conditionally so that one logical state of the bit makes it impossible to modify the contents of the counters by writing in the registers 18 and 19 following an overflow indicated by a bit of the register 87, and so that the complementary logical state of the bit makes it possible to modify the contents of the counters by writing in the registers 18 and 19, regardless of the contents of the register 87. A third bit is provided for deactivating the interrupt in case of an overflow as mentioned above, so that one logical state of the bit makes the interrupt active and so that the complementary logical state of the bit makes the interrupt inactive. A fourth bit is provided for resetting the contents of the counters 81, 82, 91, 92 to zero. It is possible to provide a fourth bit common to all the counters or as many fourth bits as there are counters, in which case each fourth bit acts on the counter to which it is assigned.

It is important to understand that the management of the counters, physically located in the unit 6, takes place without disturbing the memory accesses through the bus 7 and the link 17 carried out by the processes executed by the processors 1 through 4, 21 through 24, 41 through 44, and 61 through 64. Thus, the counting of the hits and misses in the local and remote memory space does not of itself generate cache memory hits or misses. Moreover, obtaining access via the bus 7 to the counters 81, 82, 91, 92 and to the registers 18, 19, 86 and 87 by means of read or write operations of the input-output type, does not involve the caching mechanisms linked to the tables 8 and 9. The only processes capable of disturbing the caching mechanisms are the processes that use the contents of the counters 81, 82, 91, 92, which can be used to generate reports on the performance of the operating system or of the applications run by the machine, or possibly even used to activate real-time optimization procedures such as, for example, memory reallocations. However, these processes can be so insignificant relative to the other processes executed by the machine that the measurements they make it possible to obtain are practically identical to those obtained in the complete absence of any effect of these measuring processes on the caching mechanisms.

The architecture of the registers 86 and 87 makes it possible to create various types of measuring processes implemented by programs executed in the processors 1 through 4. Among these are those activated by an interrupt generated in the register 87, or those activated periodically through interaction with the register 86. A measuring process simultaneously reads the contents of the four counters 81, 82, 91, 92 and processes the values obtained.

The sum of the values contained in the four counters 81, 82, 91, 92 gives a number NO of memory accesses, for example between two counter overflows or at regular time intervals. The ratio of the content of the counter 81 to the number of memory accesses gives a local hit ratio TL1. The ratio of the content of the counter 82 to the number of memory accesses gives a local miss ratio TL2, that is, for accesses to the blocks resident in the memory 5'. The ratio of the content of the counter 91 to the number of memory accesses gives a remote hit ratio TR1. The ratio of the content of the counter 92 to the number of memory accesses gives a remote miss ratio TR2, that is, for accesses to the blocks resident in the memories 25', 45', 65'. The sum of the values contained in the registers 81 and 91 gives a value N1 of hits in the memory without a remote transaction. The sum of the values contained in the registers 82 and 92 gives a number N2 of misses accompanied by remote transactions. The ratio of the number N1 to the number NO gives a local memory access ratio TR3. The ratio of the number N2 to the number NO gives a remote memory access ratio TR4. These few examples show the abundance of possible uses for the contents of the counters 81, 82, 91, 92 provided by the hardware configuration of the unit 6 to the user of the machine for increasing its performance.

Figure 5:
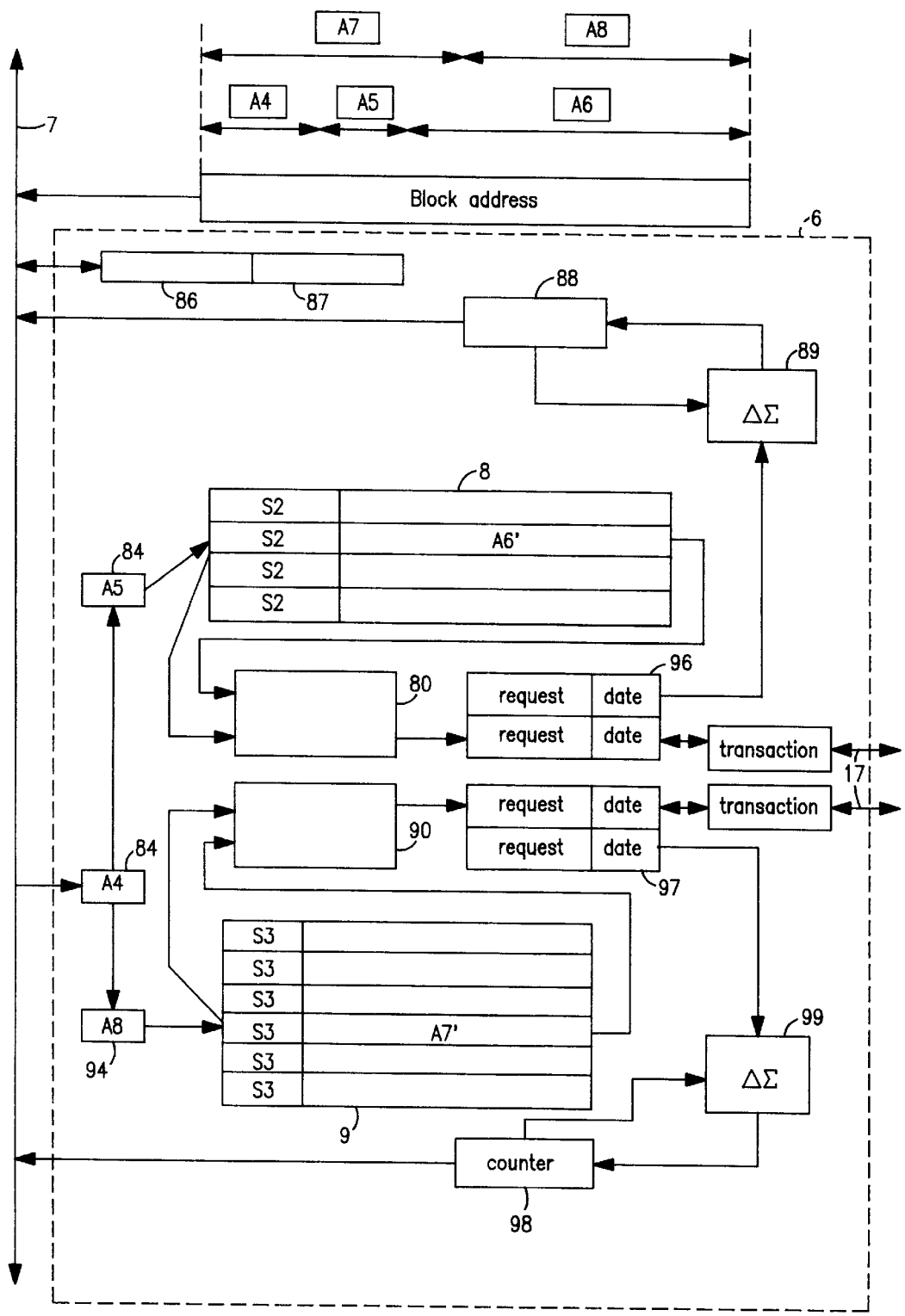
FIG. 5 presents other possible details of the invention.

FIG. 5 presents other possible details of the unit 6. Each time the combinational logic element 80 generates a signal LM, the request that originated the signal LM is stored in a stack 96 with the acceptance date of this request in the unit 6 through the filter 85, to wait for processing so this request can be fulfilled. Each time the combinational logic element 90 generates a signal RM, the request that originated the signal RM is stored in a stack 97 with the acceptance date of this request, to wait for processing so this request can be fulfilled. As seen above, each signal LM and RM is accompanied by a first transaction with a remote module which can itself initiate other, cascaded intermediate transactions. This first transaction ends when the unit 6 receives, through the link 17, a response that allows it to complete the processing of the request that originated the signal LM or RM. The processing of a request is complete when the unit 6 transmits a valid copy of the block through the bus 7 following a read request or more simply an acknowledgement, following a write request. Upon completion of the processing of a request stored in the stack 96, an adder-subtracter 89 subtracts the acceptance date of the request from the completion date of the processing of the request and adds the difference Δ obtained to the content Σ of a register 88. The register 88 acts like a counter of the accumulated time between the acceptance of a request and the completion of its processing by the unit 6. The register, also called a counter 88 is read-accessible through the bus 7. Upon completion of the processing of a request stored in the stack 97, an adder-subtracter 99 subtracts the acceptance date of the request from the completion date of the processing of the request and adds the difference Δ obtained to the content Σ of a register 98. The register 98 acts like a counter of the accumulated time between the acceptance of a request and the completion of its processing by the unit 6. The register, also called a counter 98 is read-accessible through the bus 7.

The register 87 contains, for each counter 88, 98, a bit whereof a predetermined logical state indicates an overflow of the counter to which this bit is assigned. The bits of the register 86 control the counters 88 and 98 in a way identical to that described in reference to FIG. 4 for the counters 81, 82, 91, 92.

The read access to the counters 88 and 98 allows a process executed in the module 10 to estimate the latency of transactions with the remote modules 20, 40, 60, using the counter 88 for accesses to blocks resident in the module 10, and using the counter 98 for accesses to blocks resident in a remote module 20, 40, 60.

The various elements of the unit 6 described can be used to calculate the average time required to access the memory and constitute a local diagnostic tool.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

What is claimed is:

1. A machine with non-uniform memory access, constituted by a plurality of modules (10, 20, 40, 60), each module comprising at least one processor (1, 21, 41, 61), a memory part (5, 25, 45, 65) and a unit (6, 26, 46, 66) having at least a first table (8) for managing local accesses to a memory part (5') local to the module (10) and a second table (9) for managing accesses to a memory part (25', 45', 65') remote from the module (10), by means of a system bus (7), characterized in that the machine comprises:

a first counter (81) of hits in the local memory part (5') not requiring a transaction with a remote module;

a second counter (82) of misses in the local memory part requiring at least one transaction with a remote module;

a third counter (91) of hits in the remote memory part not requiring a transaction with a remote module;

a fourth counter (92) of misses in the remote memory part requiring at least one transaction with a remote module.

2. The machine with non-uniform memory access according to claim 1, characterized in that each of the four counters (81, 82, 91, 92) is physically located in an associated unit (6).

3. The machine with non-uniform memory access according to claim 1, characterized in that the four counters (81, 82, 91, 92) are read-accessible through the system bus (7) in an input-output mode.

4. The machine with non-uniform memory access according to claim 2, characterized in that the four counters (81, 82, 91, 92) are read-accessible through the system bus (7) in an input-output mode.

5. The machine with non-uniform memory access according to claim 1, characterized in that the machine comprises:

a local memory latency counter (88) for adding up latencies of the accesses to the local memory part (5') that require a transaction with a remote module;

a remote memory latency counter (98) for adding up the latencies of the accesses to the remote memory part (25', 45', 65') that require a transaction with a remote module.

6. The machine with non-uniform memory access according to claim 5, characterized in that the local memory latency counter and the remote memory latency counter (88, 98) are physically located in the unit (6).

7. The machine with non-uniform memory access according to claim 6, characterized in that the local memory latency counter and an remote memory latency counter (88, 98) are read-accessible through the system bus (7) in the input-output mode.

8. The machine with non-uniform memory access according to claim 5, characterized in that the local memory latency counter and the remote memory latency counter (88, 98) are read-accessible through the system bus (7) in an input-output mode.

9. The machine with non-uniform memory access according to claim 1, characterized in that the unit (6) comprises a control register (86) and a status register (87), the status register (87) being read- and write-accessible through the system bus (7) in an input-output mode, the status register (87) being read-accessible through the system bus (7) in the input-output mode.

10. A process for calculating average memory access time, comprising multiplying the contents:
of a first counter (81) of hits in a local memory part (5) by an average hit time in the local memory part,
of a second counter (82) of misses in the local memory part (5) by an average miss time in the local memory part,
of a third counter (91) of hits in a remote memory part (25, 45, 65) by an average hit time in the remote memory part,
of a fourth counter (92) of misses in the remote memory part (25, 45, 65) by an average miss time in the remote memory part, adding the four results thus obtained, and dividing this sum by the sum of the contents of the four counters (81, 82, 91, 92).

11. A process for calculating average memory access time, comprising multiplying the contents of a first access counter (81) of hits in a local memory part (5) by an average hit time in the local memory part, multiplying the contents of a second access counter (91) of hits in a remote memory part (25, 45, 65) by an average hit time in a remote memory part, adding the two results thus obtained to the contents of a local memory latency counter (88) for adding up the latencies of the accesses to the local memory part (5) that require a transaction with a remote module, adding up the latencies of the accesses of a remote memory latency counter (98) to the remote memory part that require a transaction with a remote module (20, 40, 60), and dividing this sum by the sum of the contents of the first and the second access counters (81, 91) and of two access counters (82, 92) for counting misses in the local memory part and the remote memory part to calculate the average memory access time.

* * * * *